Jan. 29, 1952     J. W. RASMUSSEN     2,583,881
DUST COLLECTOR
Filed March 30, 1946
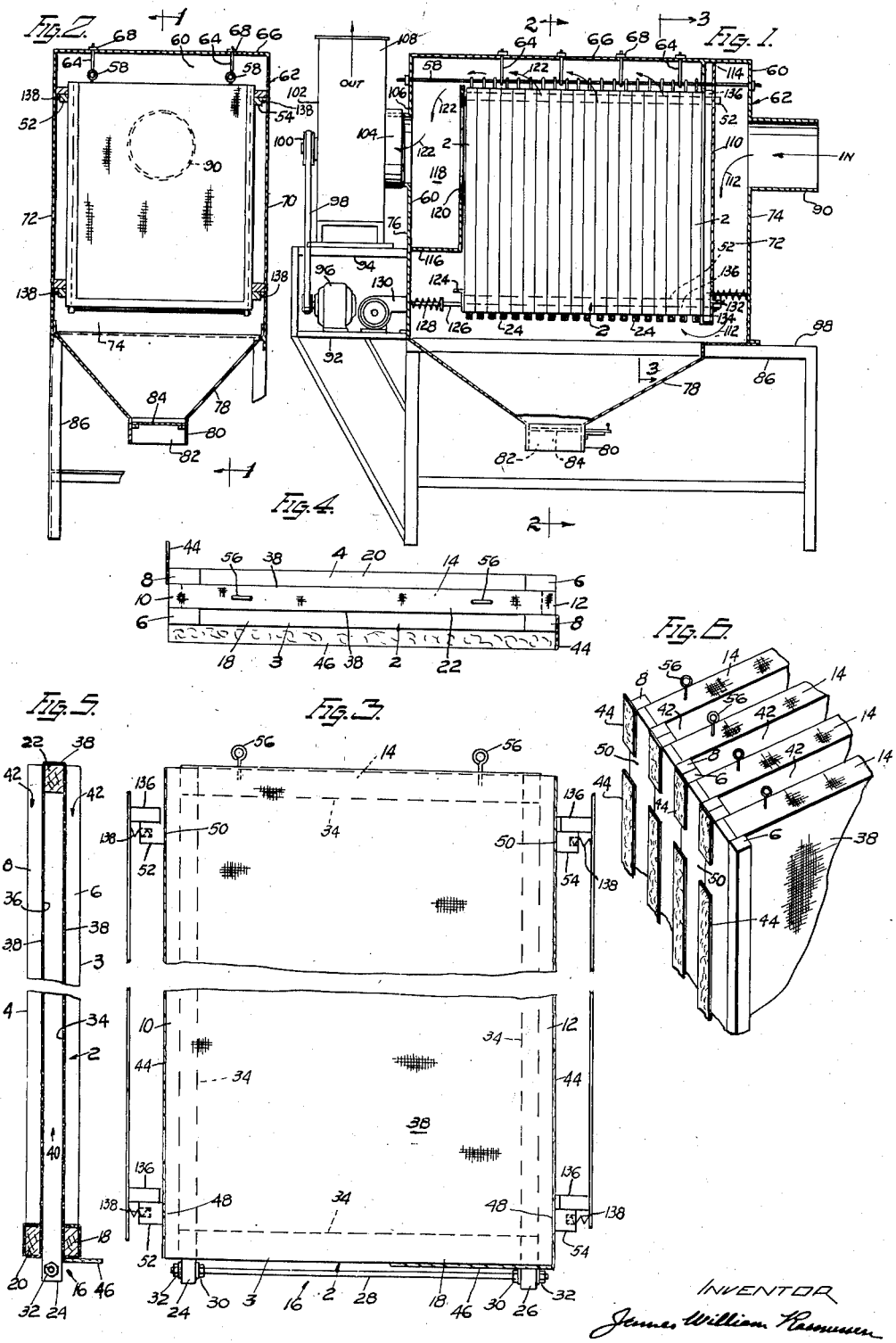

Patented Jan. 29, 1952

2,583,881

UNITED STATES PATENT OFFICE 2,583,881

DUST COLLECTOR

James William Rasmussen, Los Angeles, Calif.

Application March 30, 1946, Serial No. 658,481

1 Claim. (Cl. 183—59)

My invention relates to dust collectors and more particularly to a specially constructed dust and air segregating apparatus which is employed in and for clarifying the dust laden air condition, for preventing the dust, fibre, silt, or chemicals, of whatsoever form, consistency or composition to float and contaminate the air, in mills and factories, and thereby improving working conditions therein.

Accordingly an object of my invention is to provide a dust collecting apparatus, which is provided with a set of separable, removable, and interchangeable dust separators, having an area of sufficient size for separating and for clarifying the passing dust or foreign matter laden air, quickly and efficiently.

Further object of my invention is to provide said dust collecting and air clarifying apparatus with a shaker means for removing any and all portions of said dust so collected, thereby allowing said apparatus to function and to operate continually, efficiently, and uninterruptedly at all times.

Another object of my invention is to provide said apparatus with a plurality of detachably mounted dust collecting sections, which are so arranged therein that each, or any one of said sections may be quickly taken out, repaired, or exchanged for a new one, in case it should be necessary or required.

Further object of my invention is to provide each of said dust collecting sections with sealing means, with which to seal the combination of several into one and a complete unit.

Further object of my invention is to provide said apparatus with suitable means for removing the dust or any foreign matter so collected, from said apparatus and thereby rendering same serviceable at all times.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction, and novel combinations and arrangements of parts, which will more fully appear in the course of the following description. However, the drawings merely show and the following description merely describes one embodiment of the present invention, which is given by way of illustration or example only.

Reference now is had to the accompanying drawing, in which the similar reference characters denote the similar parts.

In the drawings:

Fig. 1 shows a side sectional and partly elevational view of the dust collector apparatus, taken in the direction of lines 1—1 of Fig. 2.

Fig. 2 is an elevational view of the apparatus, taken in the direction of the lines 2—2 of Fig. 1.

Fig. 3 is a fragmentary front elevational view of the screen section, taken in the direction of the arrows 3—3 of the Fig. 1.

Fig. 4 is a top view of the screen section taken from the top of the Fig. 3.

Fig. 5 is a fragmentary side elevational view of a screen section, taken from the left of the Fig. 3.

Fig. 6 is a fragmentary perspective view of the screen sections, showing their assembly into one unit.

Describing my invention more in detail, said invention comprises a screen section 2, which consists of a set of outer frames 3 and 4, each of which is provided with a pair of uprightly extending members 6 and 8, supported in place by means of a center member 10 and 12 on each side, to which the top cross member 14 is attached, while at the bottom section 16 said uprightly extending members 6 and 8 are supported in place by means of the bottom cross members 18 and 20, thus providing a set of U-shaped outer frames 3 and 4 disposed at the outside, and having a center U-shaped frame 22, extending downwardly for forming said screen section 2.

In order to hold said outer frame 3, 4, and 22, rigidly in position, said center members 10 and 12 extend partially below the bottom section 16, as at 24 and 26, to which a cross rod 28 is attached and which is held in position by means of a set of lock nuts 30 and 32 respectively.

The entire inner area 34 and 36 enclosed by said uprights 6 and 8 with their respective cross members 18 and 20 at the bottom 16, and the top cross member 14 of the center members 10 and 12, is covered and enclosed by means of a suitable screen or a dust collecting means 38. The screen is thus fastened and held taut and a center air passage 40 provided.

Said upright members 6 and 8 provide a separating means for adjacently disposed screen sections 2, and an outer air passage 42 as shown more particularly in Fig. 6.

In order to seal each and every screen section 2 one from the other, said uprights 8 at each side, are provided with a set of side sealing or flap members 44, which may be made out of felt or other suitable material, so that when said screen sections rest against each other, said flap members 44 will over-lap and will seal the next frame; also, for sealing said bottom 16 of the frame, the bottom cross member 18 of said screen section 2 is provided with a bottom flap 46, thereby sealing the space between said screen sections, by laying over the cross member 20.

In this manner the seal is provided at the sides and the bottom of said screen sections 2, allowing the air to pass only through the opening 40 of each screen and to emerge through the screens 38, then passing through the outer passages 42 provided therein, or, if so desired, a cloth sheet may be used for that purpose, with equally good results.

In order, however, to hold said screens 2 when assembled in a position and when grouped in one unit, so that the sideward movement may be prevented, suitable bearing spaces 48 and 50 are provided, which are disposed in close proximity to the bottom and the top of said screens, as shown in Figs. 3 and 6, and against which the supporting bar members 52 and 54 are placed, the purpose of which and the operation thereof, will be presently described.

Said top cross member 14 of said screens 2 is provided with a pair of eyelets or hooks 56, which are securely disposed therein and extend upwardly over the surface, and which are for the purpose of mounting the screens upon suitable mounting rods 58, and which are held securely within the upper section 60 of the housing 62. Said rods 58 are suspended in position and are held in place by means of a plurality of suspending rods 64, which are mounted in the housing cover member 66 and secured in place by means of nuts 68, and which are so positioned therein whereby the removal of said screens or the repair of the entire apparatus may be accomplished quickly and without undue delay.

Said housing 62 comprises a front side 70 and the rear side 72, also, it is provided with an air intake side 74 and the air exhaust side 76, the bottom section thereof is provided with a dust reservoir 78, which is provided with a suitable spout member 80 having its passage 82 enclosed by means of a sliding cover plate 84.

The entire housing 62 is mounted upon a suitably arranged frame 86, one end of which is provided with an extension 88 from which the intake pipe or duct 90 may be reached, while the opposite end of said frame is provided with platforms 92 and 94.

Upon said platform 92 is mounted a suitable motor 96 which is provided with driving means such as a belt 98 and which engages the driver member 100 of a blower 102 mounted upon the upper platform 94.

Said blower 102 has an intake port 104 connected to the exhaust connection 106 of said housing 62, while the blower exhaust 108 extends upwardly, and which, if so desired, may be connected to any other outlet, or be directionally positioned in any suitable manner as in practice may be most desirable.

When the dust laden air enters the housing 62 through the duct 90, the flow of said air is induced by means of the action of said blower 102, causing said air to flow against a baffle plate 110, which encloses the interior of said housing 62, at the sides 70 and 72, including the inner surface of said cover member 66, excepting the air intake side 74, allowing the incoming flow of air to pass downwardly in the direction of the arrow 112.

Said baffle plate 110 is hingedly or loosely connected at the upper section 114 which is for the purpose of keeping the screen sections in line and permitting no air to pass therethrough while the air passes downwardly towards the exhaust end.

At the exhaust end there is provided an exhaust chamber 118 having a bottom plate 116 and a vertical wall adjacent the last screen section 2, said vertical wall being provided with an opening 120. The air is thus caused to pass through said center air passages 40 then through the dust collecting screens 38 and finally through the outside passages 42, flowing in the direction of the arrows 122 and into the intake 106 of said blower 102.

It may then be noted, that said dust laden air is screened completely, the clean air passing into said blower 102 and out through the exhaust connection 108, while the dust remains upon said dust collecting screen 38.

In order to remove said dust from said screen 38 a suitable cross member 124 is provided at the bottom of the screen 2, which provides a support for the blows of the hammer rod 126, which is supported by means of a spring 128, while said hammer rod 126 is energized by means of a suitable driving or vibrating member 130.

Said vibrator member 130 operates continuously and thereby vibrating said screen units 2 during the operation of the apparatus, and also vibrating said screens when the flow of air is cut off.

In order to prevent said screen sections 2 from separating at the bottom section 16 a suitable spring support 132 is provided at the bottom section 134 of said baffle plate 110, thus permitting a rapid succession of blows to be delivered to the entire unit composed of said screens 2, causing said dust so collected to drop to the bottom 16 of said screens, also allowing said dust to pass, during said vibratory movement of said screens, through the passage formed by said bottom flaps 46, so that said dust may be collected within said reservoir 78 wherefrom it is removed when required.

To prevent the sideward movement of said unit composed of said screens 2, said housing 62 internally of said front side 70 and the rear side 72 is provided with a set of longitudinal stay bars 136, which are for the purpose of holding said side supporting bar members 48 and 50 in a floating position and which are supported therein by means of suitable springs 138, as shown.

In this manner, said entire unit composed of said screen sections 2 is floating in its entirety, each screen section operating independently of the other and in operation causing the flow of air to be directed into each section and thereby increasing the efficiency of the entire apparatus.

While I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein, which may come within the scope of the appended claim.

I claim as my invention;

A dust collector comprising a housing, an inlet, baffle means in said housing for diverting downwardly the dust laden air flowing through said inlet, frame members in said housing each consisting of two upright U-shaped support members, an inverted U-shaped support member fixed therebetween and a screen extending from the lower cross bar of said upright U members to cover the upper bar of said inverted U members; said frames being hingedly and independently suspended in horizontal alignment and in close contact to form an assembly having a first set of pockets open at the bottom and a second set of pockets opening upwardly with said screens interposed between the two sets of pockets; a blower for moving dust laden air through said assembly, a vibrator for shaking said assembly to dislodge filtered material from said screens and a reservoir beneath said assembly for collecting said material.

JAMES WILLIAM RASMUSSEN.

REFERENCES CITED

The following references are of record in the file of this patent:

UNITED STATES PATENTS

| Number | Name | Date |
| --- | --- | --- |
| 567,341 | Gray | Sept. 8, 1896 |
| 1,602,345 | Eiben | Oct. 5, 1926 |
| 1,743,934 | Ruemelin | Jan. 14, 1930 |
| 1,818,736 | Moore | Aug. 11, 1931 |
| 1,850,101 | Greene | Mar. 22, 1932 |
| 1,914,667 | Kolla | June 20, 1933 |
| 1,928,670 | McCrery | Oct. 3, 1933 |
| 1,944,407 | Dahlman | Jan. 23, 1934 |
| 2,057,578 | Kleissler | Oct. 13, 1936 |

FOREIGN PATENTS

| Number | Country | Date |
| --- | --- | --- |
| 738,305 | France | Oct. 11, 1932 |